United States Patent
Baykal et al.

(10) Patent No.: US 8,341,725 B2
(45) Date of Patent: Dec. 25, 2012

(54) SECURE DHCP PROCESSING FOR LAYER TWO ACCESS NETWORKS

(75) Inventors: Berkay Baykal, Westborough, MA (US); Duane M. Butler, Anoka, MN (US); Michael W. Conner, Maple Grove, MN (US); Shaun Noel Missett, Avon, CT (US)

(73) Assignee: Calix, Inc., Petaluma, CA (US)

( * ) Notice: Subject to any disclaimer, the term of this patent is extended or adjusted under 35 U.S.C. 154(b) by 708 days.

(21) Appl. No.: 12/512,239

(22) Filed: Jul. 30, 2009

(65) Prior Publication Data

US 2011/0030032 A1 Feb. 3, 2011

(51) Int. Cl.
*H04L 29/06* (2006.01)
(52) U.S. Cl. ............ 726/13; 455/410; 370/395.53
(58) Field of Classification Search ............ 726/13
See application file for complete search history.

(56) References Cited

U.S. PATENT DOCUMENTS

| | | | |
|---|---|---|---|
| 5,884,024 A * | 3/1999 | Lim et al. | 726/3 |
| 7,286,537 B2 * | 10/2007 | Roh | 370/392 |
| 7,917,621 B2 * | 3/2011 | Suzuki et al. | 709/225 |
| 8,200,798 B2 * | 6/2012 | Yadav et al. | 709/223 |
| 2006/0236093 A1 * | 10/2006 | Brok et al. | 713/151 |
| 2009/0304008 A1 * | 12/2009 | Kono et al. | 370/395.53 |
| 2010/0191813 A1 * | 7/2010 | Gandhewar et al. | 709/206 |
| 2011/0010769 A1 * | 1/2011 | Jarredal | 726/13 |

OTHER PUBLICATIONS

Droms, "Dynamic Host Configuration Protocol," Network Working Group, RFC2131, Mar. 1997, 45 pages.
U.S. Appl. No. 12/512,245, entitled "Secure DHCP Processing for Layer Two Access Networks," filed Jul. 30, 2009.

* cited by examiner

*Primary Examiner* — Matthew Smithers
(74) *Attorney, Agent, or Firm* — Fogg & Powers LLC

(57) ABSTRACT

In general, this disclosure describes network security techniques that may accommodate legitimate movement of a subscriber device while preventing MAC collisions that may result from configuration errors or MAC spoofing attempts. MAC spoofing may result in packets directed to one subscriber device being sent instead to another subscriber device. By modifying an access node or a Dynamic Host Configuration Protocol (DHCP) server to allow only authorized subscriber devices on the access network, layer two collisions ("MAC collisions") may be prevented.

35 Claims, 5 Drawing Sheets

SECURE DHCP PROCESSING FOR LAYER TWO ACCESS NETWORKS

TECHNICAL FIELD

The invention relates to computer networks and, more particularly, to network security.

BACKGROUND

A service provider network typically comprises a number of different types of computer networks interconnected to one another. One type of network referred to as an access network enables host devices, which may also be referred to as subscriber devices or customer premises equipment (CPE), to access the service provider network via subscriber lines. Subscriber devices or CPE may comprise set-top boxes (STBs), laptop computers, desktop computers, mobile devices (such as mobile cellular phones and so-called "smart phones"), Voice over Internet Protocol (VoIP) telephones, workstations, modems, wireless access points (WAPs), gaming consoles, and other devices capable of accessing or otherwise facilitating access to the service provider network.

The access network typically comprises a number of access nodes, such as a Digital Line Subscriber Line Access Multiplexer (DSLAM) or a Cable Modem Termination System (CMTS), that each manages access by one or more of the subscriber devices to the service provider network. The access node may, for example, multiplex (or "aggregate") traffic from subscriber devices into a composite signal and transmit this signal upstream to the subscriber network for delivery to one or more destinations.

In addition to access nodes, the access network typically comprises one or more Open Systems Interconnection (OSI) layer two switches that connect subscriber devices to an OSI layer three device, e.g., an access router. A layer two switch may be configured to switch network traffic toward an access node using the media access control (MAC) address of the subscriber device. The access node also uses the MAC address in order to direct the network traffic to the correct host device. Both the access node and the switch maintain tables, e.g., bridging tables, that map the physical ports on the access node or switch to the destination MAC addresses of the subscriber devices. In this manner, the access node or the switch is able to determine which of their respective ports should be selected to send traffic to a specific subscriber device.

SUMMARY

In general, this disclosure describes network security techniques that may accommodate legitimate movement of a subscriber device while preventing MAC collisions that may result from configuration errors or MAC spoofing attempts. MAC spoofing may result in packets directed to one subscriber device being sent instead to another subscriber device. By modifying an access node or a Dynamic Host Configuration Protocol (DHCP) server to allow only authorized subscriber devices on the access network, layer two collisions ("MAC collisions") may be prevented.

Using the techniques described in this disclosure, MAC collisions may be detected and resolved for legitimate device movement. In some implementations, MAC collisions may be detected and resolved without the need for disabling a port or subscriber line, and without additional, e.g., manual, configuration by an operator. Additionally, using the techniques of this disclosure, MAC collisions may be detected and resolved when a layer two domain is shared between access nodes.

In one example, the disclosure is directed to a method comprising receiving a data unit comprising a layer three address assigned to a subscriber device, and if the subscriber device has been assigned the layer three address, then storing, in a memory device, an association between a layer two address of the subscriber device and the layer three address assigned to the subscriber device, and admitting the subscriber device on an interface of the network device based on the assignment of the layer three address.

In another example, the disclosure is directed to a network device comprising a control unit configured to receive a data unit comprising a layer three address assigned to a subscriber device, and if the subscriber device has been assigned the layer three address, then store, in a memory device, an association between a layer two address of the subscriber device and the layer three address assigned to the subscriber device, and admit the subscriber device on an interface of the network device based on the assignment of the layer three address.

In yet another example, the disclosure is directed to a computer-readable medium comprising instructions encoded on the computer-readable medium that, upon execution, cause a processor within a network device to receive a data unit comprising a layer three address assigned to a subscriber device, and if the subscriber device has been assigned the layer three address, then store, in a memory device, an association between a layer two address of the subscriber device and the layer three address assigned to the subscriber device, and admit the subscriber device on an interface of the network device based on the assignment of the layer three address.

In another example, the disclosure is directed to a network device comprising means for receiving a data unit comprising a layer three address assigned to a subscriber device, and if the subscriber device has been assigned the layer three address, then means for storing, in a memory device, an association between a layer two address of the subscriber device and the layer three address assigned to the subscriber device, and means for admitting the subscriber device on an interface of the network device based on the assignment of the layer three address.

In yet another example, the disclosure is directed to a method comprising receiving a layer two domain identifier of a layer two domain in which a first subscriber device resides, storing an association between the layer two domain identifier of the first subscriber device and a layer two address of the first subscriber device, and comparing a layer two domain identifier and a layer two address of a second subscriber device attempting to acquire a layer three address with the layer two domain identifier and the layer two address of the first subscriber device. If the first subscriber device and the second subscriber device share the same layer two address and share the same layer two domain identifier, then denying a layer three address to the second subscriber device based on the comparison, and if the first subscriber device and the second subscriber device share the same layer two address but have different layer two domain identifiers, then offering the second subscriber device a layer three address based on the comparison.

In yet another example, the disclosure is directed to a network device comprising a processor configured to receive a layer two domain identifier of a layer two domain in which a first subscriber device resides, store an association between the layer two domain identifier of the first subscriber device and a layer two address of the first subscriber device, and compare a layer two domain identifier and a layer two address of a second subscriber device attempting to acquire a layer three address with the layer two domain identifier and the layer two address of the first subscriber device. If the first subscriber device and the second subscriber device share the same layer two address and share the same layer two domain identifier, then deny a layer three address to the second subscriber device based on the comparison, and if the first subscriber device and the second subscriber device share the same layer two address but have different layer two domain identifiers, then offer the second subscriber device a layer three address based on the comparison.

In yet another example, the disclosure is directed to a computer-readable medium comprising instructions encoded on the computer-readable medium that, upon execution, cause a processor within a network device to receive a layer two domain identifier of a layer two domain in which a first subscriber device resides, store an association between the layer two domain identifier of the first subscriber device and a layer two address of the first subscriber device, and compare a layer two domain identifier and a layer two address of a second subscriber device attempting to acquire a layer three address with the layer two domain identifier and the layer two address of the first subscriber device. If the first subscriber device and the second subscriber device share the same layer two address and share the same layer two domain identifier, then deny a layer three address to the second subscriber device based on the comparison, and if the first subscriber device and the second subscriber device share the same layer two address but have different layer two domain identifiers, then offer the second subscriber device a layer three address based on the comparison.

In yet another example, the disclosure is directed to a network device comprising means for receiving a layer two domain identifier of a layer two domain in which a first subscriber device resides, means for storing an association between the layer two domain identifier of the first subscriber device and a layer two address of the first subscriber device, and means for comparing a layer two domain identifier and a layer two address of a second subscriber device attempting to acquire a layer three address with the layer two domain identifier and the layer two address of the first subscriber device. If the first subscriber device and the second subscriber device share the same layer two address and share the same layer two domain identifier, then means for denying a layer three address to the second subscriber device based on the comparison, and if the first subscriber device and the second subscriber device share the same layer two address but have different layer two domain identifiers, then means for offering the second subscriber device a layer three address based on the comparison.

The details of one or more examples are set forth in the accompanying drawings and the description below. Other features, objects, and advantages will be apparent from the description and drawings, and from the claims.

DETAILED DESCRIPTION

Operators are faced with a dilemma regarding media access control (MAC) collisions. The dilemma for operators is allowing legitimate device movement while isolating and preventing MAC collisions created by malicious or accidental duplication of physical layer two device identities. In general, this disclosure describes network security techniques that accommodate legitimate movement of a subscriber device while preventing or resolving MAC collisions that may result from configuration errors or MAC spoofing attempts.

When a network device, e.g., an access node or a switch, receives a new MAC address and port to be entered into a bridging table, a MAC collision may occur when the new MAC address to be entered already exists in the bridging table and is paired, or mapped, in the bridging table with a port that is different than the port that is associated with the new MAC address. In other words, a MAC collision occurs when the same MAC address is attempting to be assigned to two different ports on the network device. The network device may be unable to reconcile which of the two ports should be used to send the traffic to reach the specified MAC address.

MAC collisions may occur for several reasons. For example, the manufacturer may have inadvertently configured two subscriber devices with identical MAC addresses. Or, the subscriber device may be a portable device, e.g., laptop computer, mobile cellular phone, smart phone, a gaming device, or the like, which may be moved from one subscriber line to another. Or, the operator may be using a test device to turn up service or diagnose a problem. "Turn up" refers to the process of enabling one or more services for a subscriber by, for example, installing any required equipment at a customer site and configuring this equipment and access equipment. Or, a malicious user may be trying to disrupt service in the access network by using a physical layer two identity, i.e., a MAC address, different than the address originally programmed on the user's device. This practice is sometimes referred to as "MAC spoofing". MAC spoofing may, in some instances, allow a user to direct traffic towards the user. In other instances, MAC spoofing may allow a user to poison the bridging table(s) to such an extent that the network devices begin broadcasting. For example, when a network device receives an Ethernet frame with a destination MAC address that it does not have in its bridging table, the network device will broadcast the frame to all applicable interfaces in an attempt to learn and store the MAC/interface association and store when the destination device replies. When the bridging table is full, however, learning cannot take place and broadcasting continues. This allows all end stations to see all traffic, which may severely impact and, in extreme instances, disable a network.

Figure 1:
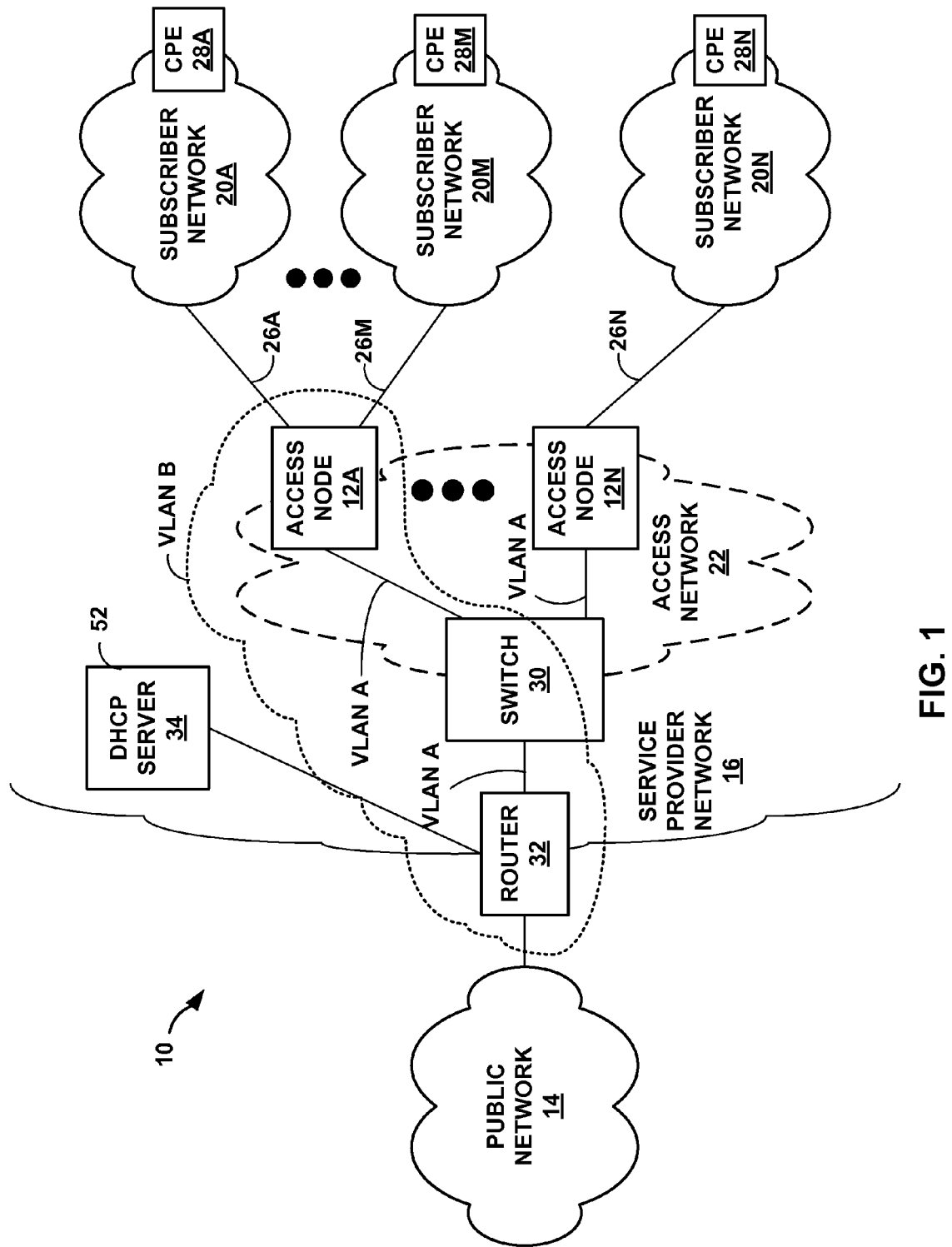
FIG. 1 is a block diagram illustrating an example network system.

FIG. 1 is a block diagram illustrating an example network system 10 in which one or more of access nodes 12A-12N ("access nodes 12") implements the techniques described in this disclosure. In the example of FIG. 1, network system 10 includes a public network 14 and service provider network 16. Public network 14 typically comprises a packet-switched network that implements an Internet Protocol (IP). For this reason, public network 14 may be referred to as an IP packet-switched network. Also, considering that IP is a layer three protocol, where layer three refers to the third or network layer of the Open Systems Interconnection (OSI) model, public network 14 may be referred to as a layer three packet-switched network. An example public network 14 may comprise what is commonly referred to as the Internet or any other network that is generally accessible by the public.

In any event, public network 14 may comprise a plurality of interconnected network devices (not shown in FIG. 1) that communicate data in the form of IP packets between one another. These network devices may comprise web servers, application servers, data servers, print servers, routers, gateways, switches, hubs, workstations, desktop computers, laptop computers, mobile cellular phones (including so-called "smart phones"), personal digital assistants (PDAs), or any other device capable of accessing or facilitating access to public network 14.

Service provider network 16 may comprise a network maintained and operated by a service provider, such as Verizon Communications Incorporated or American Telephone and Telegraph (AT&T) Company. Typically, the service provider may operate service provider network 16 to facilitate access by subscriber networks, such as subscriber networks 20A-20N ("subscriber networks 20"), to public network 14. A subscriber who maintains and operates one of subscriber networks 20 may contract with the service provider for this so-called "network access." To facilitate this access, service provider network 16 may include a sub-network, shown in FIG. 1 as access network 22.

Access network 22 may comprise a sub-network within service provider network 16 that facilitates access to service provider network 16 by subscriber networks 20. Access network 22 may include a plurality of access nodes 12 that couple via dedicated subscriber lines 26A-26N ("subscriber lines 26") to each of subscriber networks 20, respectively. Subscriber lines 26 are "dedicated" in that each of subscriber lines 26 connects one and only one of subscriber networks 20 to a respective one of access nodes 12 rather than connecting multiple ones of subscriber networks 20 to a respective one of access nodes 12. For example, subscriber line 26A is a dedicated subscriber line because it connects only subscriber network 20A to access node 12A.

Subscriber lines connect subscriber devices (or "hosts") to access nodes 12. Subscriber devices are shown in FIG. 1 as customer premise equipment (CPE) 28A, 28M, and 28N ("CPE 28") and each of CPE 28 may comprise one or more of a Set-Top Box (STB), a desktop computer, a laptop computer, a PDA, a VoIP telephone, a regular telephone, a cellular phone, a smart phone, a wireless access point (WAP), a router, a switch, a hub or any other type of computing or network device capable of accessing or facilitating access of multicast content. For ease of illustration, only one subscriber device has been depicted in FIG. 1 with respect to each subscriber network. However, it should be noted that each subscriber network 20 may comprise two or more subscriber devices, e.g., a household with two computers and a Set-Top Box. A Set-Top Box may be, for example, a device that allows a user to access the Internet via a television set.

When more than one of subscriber networks 20 is connected by a single one of subscriber lines 26 to a respective one of access nodes 12, the subscriber line is referred to as a "shared" subscriber line. However, even when shared, the subscriber line may be logically divided into dedicated virtual subscriber lines for each one of the subscriber networks sharing the line by way of, for example, a Virtual Local Area Network (VLAN) technique. For ease of illustration purposes, the techniques are described with respect to dedicated subscriber lines. Yet, the techniques may also be implemented with respect to shared subscriber lines and, as a result, the techniques should not be limited to the example described in this disclosure.

Access network 22 may, in one embodiment, comprise a layer two network, where layer two refers to the second or data link layer of the OSI model. An example layer two network may comprise an Ethernet network. Typically, network devices of layer two networks switch data units, rather than route data units as in layer three networks. The data units may be referred to as "frames" or sometimes "packets" in Ethernet networks. For this reason, access network 22 is shown with a dashed line to indicate that it may be distinct from service provider network 16 in that access network 22 may comprise a layer two network while service provider network 16 may generally comprise a layer three network.

Assuming for purposes of illustration that access network 22 represents a layer two network, access network 22 may include a switch 30 that switches data units to various ones of access nodes 12. Switch 30 may comprise a layer two network device that learns MAC addresses associated with access nodes 12 and associates those MAC addresses with particular ports on which switch 30 switches the data units to access nodes 12. In this example, access nodes 12 may each comprise a Digital Subscriber Line Access Multiplexer (DSLAM) that aggregates multiple signals received via respective subscriber networks 20 onto the single communication medium, e.g., copper and fiber-optic media, connecting access nodes 12 to switch 30.

As further shown in FIG. 1, in this example, service provider network 16 further includes a router 32. Router 32 may represent a layer three network device that routes, rather than switches, data units from access network 22 to public network 14 and from public network 14 to access network 22. Router 32 may actively select between one or more routes to a destination and forward data units along the selected route, while switch 30 may generally maintain only one route to each destination and simply switch the data units to the appropriate destination. In this respect, a level 3 (L3) network device, such as router 32 may differ from a level 2 (L2) network device, such as switch 30.

Network system 10 of FIG. 1 further includes a Dynamic Host Configuration Protocol (DHCP) server 34. Although FIG. 1 depicts only a single DHCP server 34, there may be two or more DHCP servers residing within network system 10. DHCP allows a subscriber device to be automatically assigned a L3 address, e.g., an IP address, when the subscriber device connects to network system 10 via access node 12. The L3 addressing may use, for example, Internet Protocol version 4 (IPv4) or version 6 (IPv6). DHCP server 34 stores a range of IP addresses, i.e., an IP address pool, in memory. When it receives a DHCP communication from a DHCP-configured subscriber device, DHCP server 34 selects an IP address from the pool and leases it to the subscriber device for a predetermined period of time. By way of specific example, when CPE 28A attempts to connect to network system 10, CPE 28A broadcasts a DCHP "discovery" data unit. DHCP server 34 responds to CPE 28A with a unicast DCHP "offer" data unit. There may, however, be additional DHCP servers that each send a DHCP "offer" to CPE 28A. The DCHP "offer" data unit includes information such as a reserved IP address for CPE 28A, the duration of the lease, as well as the IP address of the DHCP server that sent the offer. CPE 28A accepts one of the DHCP "offer" data units and broadcasts a DHCP "request" data unit that includes information such as the lease accepted and the DHCP server that provided the lease. In this manner, each DHCP server that was not chosen to provide an IP address may return the IP address that it offered to its available pool of addresses for the next subscriber device that requests an IP address. Finally, the DHCP server selected by CPE 28A to provide the IP address sends a DHCP "acknowledgement" data unit to CPE 28A, completing the IP address leasing process.

As mentioned above, both access nodes and switches maintain bridging tables that map their respective physical ports to the MAC addresses of the destination devices. These bridging tables may be populated with MAC addresses and ports through a learning process. When the network device, e.g., access node or L2 switch, is learning, the network device examines an incoming data unit, reads the MAC address of the source device contained in the data unit, compares the MAC address of the source device to the MAC addresses stored in its bridging table, and determines whether it should create a new entry in the bridging table based on the comparison. If there is no entry in the bridging table for that MAC address, the network device creates an entry and populates it with a pairing, or mapping, of the MAC address of the source device that sent the data unit and with the port of the network device that received the data unit. In this manner, the network device will be able to determine from the bridging table which one of its ports to use to send data units that are destined for the device with a particular MAC address. The learning process typically takes place with respect to DHCP data units. Typically, both access node 12 and switch 30 learn on the DHCP data units transmitted from CPE 28 to DHCP server 34.

A MAC collision occurs when the access node or layer two switch receives a data unit, compares the MAC address of the source device specified in the data unit to the MAC addresses stored in its bridging table, and determines that an entry for that MAC address already exists in its bridging table, but the entry in the bridging table is mapped to a different port or interface than the port on which the data unit was received. As used in this disclosure, the terms port and interface are used interchangeably and generally refer to a physical connector on the network device. Because the access node or layer two switch is unable to determine which of the two ports it should use to send data units specifying the single MAC address, a collision occurs and the network can no longer reliably serve the traffic for that MAC address.

MAC collisions may occur for several reasons. For example, the manufacturer may have inadvertently configured two subscriber devices with identical MAC addresses. Or, the operator may be using a test device to turn up service or diagnose a problem. Or, a user may be trying to disrupt service in the access network by using a physical layer two identity, i.e., MAC address, different than that which was programmed on their device ("MAC spoofing"). Or, the subscriber device may be a portable device, e.g., laptop computer, mobile cellular phone, smart phone, a gaming device, or the like, which may have moved from one subscriber line to another. A MAC collision is sometimes referred to as host or station movement because a MAC collision may be caused by a host connected to access node 12A via subscriber line 26A being physically moved to subscriber line 26M or subscriber line 26N, for example, while the entry in the bridging table of access nodes 12A is still mapped to the original port assigned to the host. This entry in the bridging table of access node 12A, for example, is normally removed within the time period specified by the "aging timer" set for the network device. The device is not physically behind two subscriber lines at the same time. If the device is moved faster than the aging timer, however, the network would still observe a collision.

Techniques are described in this disclosure that provide a security method to be used with layer two-based access networks where the subscriber device's layer two identity, e.g., MAC address, is used to switch traffic between the subscriber line and the layer three routed network. With layer two-based access networks, the host traffic is either transported in a 1:1 Virtual Local Area Network (VLAN) configuration, where the layer two physical address space is isolated between subscribers, or an N:1 VLAN configuration, where multiple subscriber lines are multiplexed into a single L2 bridging table. VLANs are essentially a method of dividing a MAC address space. VLANs create a virtual bridge such that all subscribers in the same VLAN are connected by the same bridge.

In FIG. 1, an N:1 VLAN configuration is depicted, denoted by "VLAN A." All subscriber lines, namely subscriber lines 26A, 26M, and 26N share the same VLAN, i.e., VLAN A, all the way up to layer three router 32. The subscriber traffic on access node 12 is aggregated to VLAN A to be switched via switch 30 towards L3 router 32. Switch 30 switches traffic towards access node 12 using the physical layer address, or MAC address, of a subscriber device. Access node 12 also utilizes the MAC address to direct the traffic to the correct subscriber line.

When the N:1 VLAN configuration is utilized, a MAC collision (e.g., two hosts with the same L2 physical identity, or MAC address, appear on two different subscriber lines) creates a problem for the access network because Ethernet packets can potentially be switched to an unauthorized subscriber if both hosts are admitted to the bridging table. MAC address-based switching is performed per VLAN. The 1:1 VLAN configuration does not have this problem because MAC addresses are not required to switch traffic to the correct subscriber device. In a 1:1 VLAN configuration, there is always one single VLAN per subscriber device. The MAC address of the subscriber device is under a single VLAN tag and as such, the MAC address cannot collide with any other subscriber device's MAC space. However, use of the 1:1 VLAN configuration creates a large VLAN space that may not be desired. As such, in many instances, the use of the N:1 VLAN configuration may be the most practical. The techniques described in this disclosure address the security gaps associated with the N:1 VLAN configuration.

Figure 2:
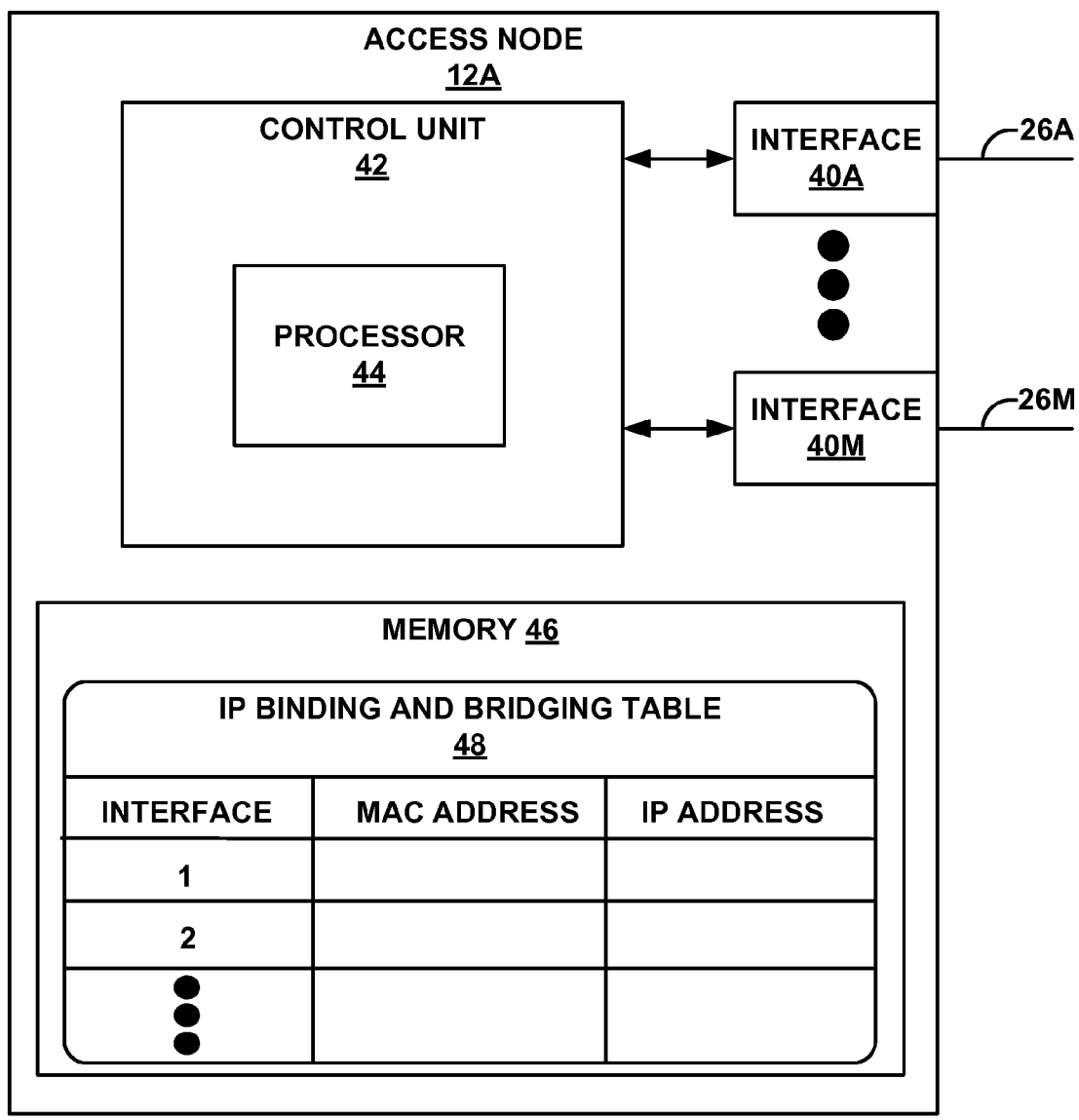
FIG. 2 is a block diagram illustrating an example of an access node that may implement the techniques described in this disclosure.

FIG. 2 is a block diagram illustrating, in more detail, an example of access node 12A shown in FIG. 1 that implements the techniques described in this disclosure. While the techniques are described below with respect to one of access nodes 12 of FIG. 1, each of access nodes 12 may comprise similar components to those described below with regards to access node 12A. The techniques are described with respect to access node 12A for ease of illustration purposes.

As shown in FIG. 2, access node 12A includes interfaces 40A-40M ("interfaces 40") that couple to respective dedicated subscriber lines 26A-26M, which in turn couple to respective subscriber networks 20A-20M. Interfaces 40 may comprise ports of one or more interface cards (not shown in FIG. 2). Alternatively, for shared subscriber lines, interfaces 40 may comprise virtual interfaces to VLANs or other virtual networks. These virtual interfaces may comprise virtual ports or other abstractions that enable one physical port to virtually represent multiple ports through use of VLAN tags or other identifiers that enable distinction among virtual networks.

Access node 12A also includes a control unit 42 that couples to each of interfaces 40. Control unit 42 may comprise one or more processors 44 that execute software instructions, such as those used to define a software or computer program, stored in a computer-readable storage medium such as memory 46 (e.g., a Flash memory, random access memory (RAM), or any other type of volatile or non-volatile memory that stores instructions), or a storage device (e.g., a disk drive, or an optical drive). Alternatively, control unit 42 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Access node 12A further stores in memory 46 an IP binding and bridging table 48. As will be described in more detail below, an IP binding maps an IP address to a port on the network device. Access node 12A keeps table 48 with respect to the subscriber lines connect to access node 12A. Bridging table 48 maps each interface 40 to the MAC addresses of the destination devices. For example, if interface 40A in FIG. 2 represents interface 1 of access node 12A, and if interface 40M in FIG. 2 represents interface 10 of access node 12A, then bridging table 48 in FIG. 2 may be populated such that interface 1 is mapped to the MAC address of CPE 28A in FIG. 1 and interface 10 is mapped to the MAC address of CPE 28M in FIG. 1. Thus, when access node 12A receives a data unit from switch 30, processor 44 of control unit 42 executes instructions that compare the destination MAC address of the data unit to the MAC addresses in bridging table 48 in order to determine where to forward the data unit. By way of example, if access node 12A receives a data unit from switch 30 that has the destination MAC address of CPE 28A, and the MAC address of CPE 28A exists in bridging table 48 and is mapped to interface 1, access node 12A will forward the data unit to CPE 28A via interface 1. Similarly, if access node 12A receives a data unit from switch 30 that has the destination MAC address of CPE 28M, and the MAC address of CPE 28M exists in bridging table 48 and is mapped to interface 10, access node 12A will forward the data unit to CPE 28M via interface 10.

As mentioned above, bridging table 48 may be populated with MAC address and interface mappings through a learning process via DHCP data units. This learning process may, however, compromise network security. For example, when an access node learns via DHCP data units, a subscriber device, as yet unauthorized by the DHCP server, may be used by a malicious user to poison the layer two, e.g., MAC address, bridging table of an access node. That is, a subscriber device that has yet to receive an IP address from a DHCP server may nevertheless cause a MAC collision because the access node learns on the DHCP data unit that is sent by the yet-to-be authorized subscriber device. In this context, learning at the access node defines the process of associating a source MAC address, received in the DHCP packet header, e.g., Ethernet header, with a given subscriber interface. A subscriber device may, for example, spoof the MAC address of another subscriber device using the access node and send out a DHCP "discover" data unit to the DHCP server.

In accordance with one technique that may be employed to prevent layer two bridging table poisoning, an access node, e.g., access node 12, only admits entries to its bridging table, e.g., bridging table 48, after the subscriber device is authorized, i.e., given an IP address by a DHCP server, e.g., DHCP server 34. That is, access node 12 does not modify its bridging table 48 based on DHCP data units until DHCP server 34 provides the subscriber device with an IP address, thereby protecting bridging table 48. By providing an IP address to the subscriber device, DHCP server 34 has essentially communicated to access node 12 that the subscriber device is entitled to use network system 10. In this manner, subscriber devices are forced to acquire a layer three identity, i.e., an IP address, on the associated interface of the access node before the subscriber device can utilize the network resources in any capacity. It should be noted that learning remains "on" on access node 12, but access node 12 does not learn on any DHCP data units from the subscriber device to the DHCP server until the DCHP server provides the subscriber device with an IP address.

In one example, control unit 42, via processor 44 and IP binding and bridging table 48, keeps track of the MAC and IP bindings per subscriber line. An IP binding maps an IP address to a port on the network device. Thus, IP binding and bridging table 48 is able to map each port with a MAC address and IP address. Although FIG. 2 depicts IP binding and bridging table 48 as a single table in memory 46, in some examples, IP binding and bridging may comprise multiple tables, or the IP bindings may be in one table and the bridging table may be a separate table. However, for ease of illustration purposes, IP binding and bridging table 48 is shown as a single table. Control unit 42 prevents any traffic on a subscriber line to be sent from any device associated with an IP address that is not mapped in the IP binding and bridging table 48 of access node 12. Additionally, control unit 42 isolates DHCP interaction by not learning the source identity of a new subscriber device until the device receives an IP address from DHCP server 34.

By way of specific example, a new subscriber device, e.g., CPE 28A, on a subscriber line, e.g., subscriber line 26A, transmits a DHCP "discovery" data unit in order to acquire an IP address from DHCP server 34. DHCP "discovery" data units are isolated, i.e., the identity of the source device CPE 28A is not used for learning, and switched towards DHCP server 34 through access network 22. As mentioned above, learning remains "on" on access node 12, but access node 12 does not learn the physical identity, i.e., the MAC address, of new subscriber device CPE 28A using the DHCP data units until after DHCP server 34 provides new subscriber device CPE 28A with an IP address.

When CPE 28A is authorized, i.e., provided with an IP address, processor 44 executes instructions that compare the IP address provided to new subscriber device CPE 28A and the MAC address of CPE 28A against the IP addresses and MAC addresses mapped in IP binding and bridging table 48. In some examples, CPE 28A is authorized when control unit 42 receives a DHCP "request" data unit from CPE 28A because, at that time, DHCP server 34 has provided an IP address to CPE 28A. In one example, CPE 28A is authorized when control unit 42 receives a DHCP "offer" data unit because, at that time, DHCP server 34 has provided CPE 28A an IP address. In other examples, CPE 28A is authorized when control unit 42 receives a DHCP "acknowledgement" data unit from DHCP server 34 because, at that time, DHCP server 34 has confirmed the IP address lease terms.

If, after comparing the IP address provided to new subscriber device CPE 28A and the MAC address of CPE 28A against the IP addresses and MAC addresses mapped in IP binding and bridging table 48, processor 44 determines that a MAC collision has occurred as a result of the DHCP "offer" data unit, processor 44 executes instructions that compare the layer three identities, i.e., IP addresses, of the two subscriber devices that caused the MAC collision. If the IP addresses are the same, i.e., DHCP server 34 offered the same IP address to both subscriber devices, processor 44 determines that one subscriber device has moved from one subscriber line to another, and that DHCP server 34 authorized the move. In response, processor 44 may execute instructions that remove the old entry in IP binding and bridging table 48, update IP binding and bridging table 48 with the entry, and admit CPE 28A on the new, or second, interface. The subscriber being offered the IP address is the new entry.

If the IP addresses are different, i.e., DHCP server 34 provided a different IP address to the two subscriber devices with the same MAC address, processor 44 executes instructions to determine whether these two devices are in the same layer two domain, e.g., VLAN, virtual bridge table, or the like. Processor 44 executes instructions and, if processor 44 determines that the two devices are in the same layer two domain, control unit 42 does not admit the new subscriber device on the new interface. Instead, processor 44 may execute instructions that declare that a collision has occurred that has not been successfully resolved by DHCP server 34, and that inform the operator of the collision, e.g., by a status or alert message. Because a different IP address has been offered to the new subscriber device, processor 44 determines that the original IP address is most likely still in use by the original subscriber device with the MAC address previously admitted to the IP binding and bridging table 48. In response, control unit 42 does not offer the new subscriber device the layer three identity on the second interface and, in order to prevent a collision with the currently authorized subscriber device, access node 12 drops the DHCP "offer" data unit.

In accordance with the techniques of the disclosure, DHCP server behavior may also be used to determine whether a subscriber device has physically moved between subscriber lines or whether another subscriber device has created a MAC collision, examples of which are provided below.

Figure 3:
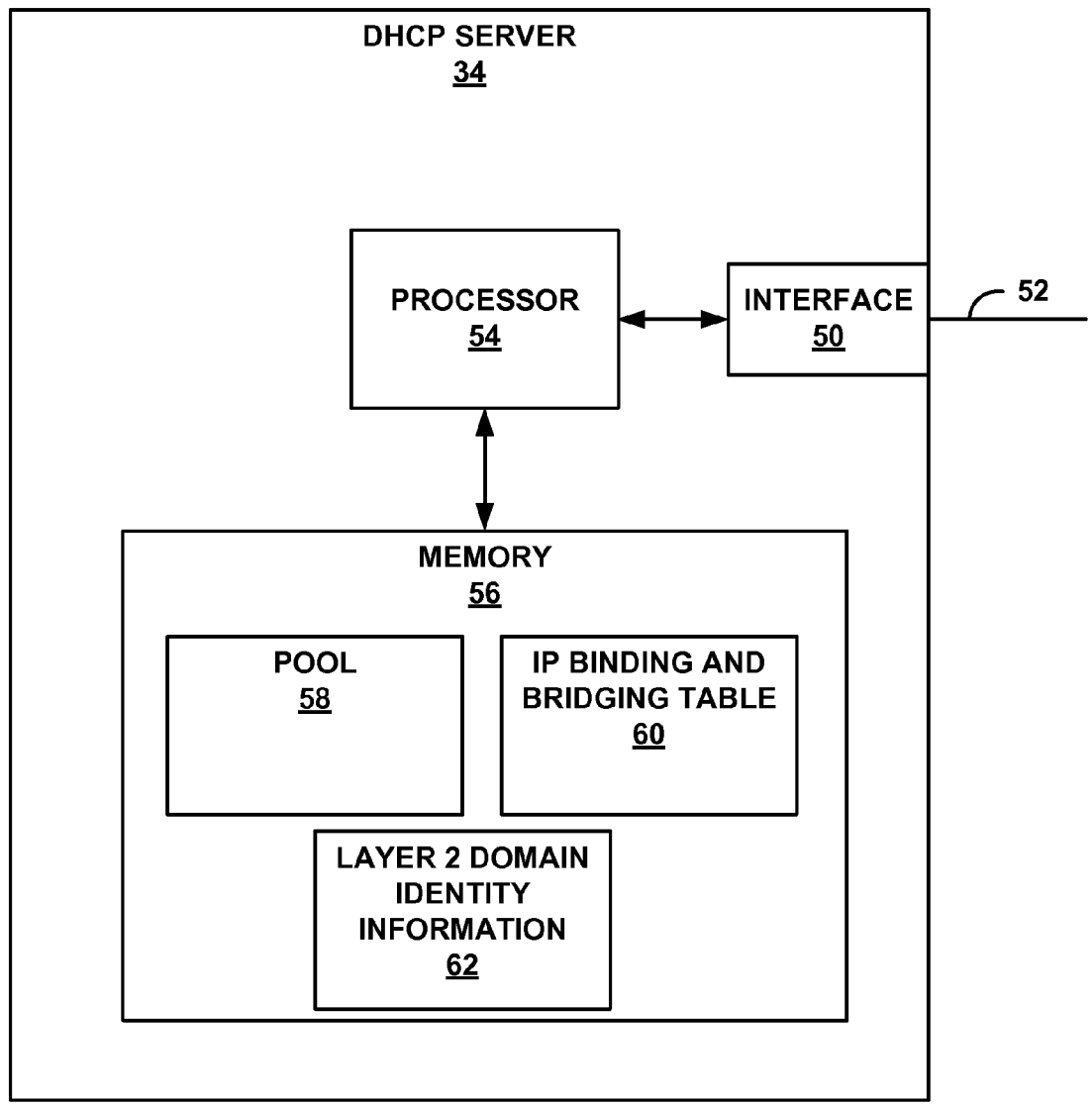
FIG. 3 is a block diagram illustrating an example of a Dynamic Host Configuration Protocol (DHCP) server that may implement the techniques in this disclosure.

FIG. 3 is a block diagram illustrating, in more detail, an example of DHCP server 34 shown in FIG. 1 that may implement the techniques described in this disclosure. DHCP server 34 includes interface 50 that couples DHCP server 34 to router 32 via line 52. In some examples, a plurality of interfaces couple DHCP server to multiple routers (not shown). DHCP server 34 also includes one or more processors 54 that execute software instructions, such as those used to define a software or computer program, stored to a computer-readable storage medium such as memory 56 (e.g., a Flash memory, random access memory (RAM), or any other type of volatile or non-volatile memory that stores instructions), or a storage device (e.g., a disk drive, or an optical drive). Memory 56 includes a pool 58 that stores a range of IP address that are available for DHCP server 34 to lease to subscriber devices, e.g., CPE 28. Memory 56 further includes an IP binding and bridging table 60 that maps each leased IP address to the MAC address of the subscriber device to which the IP address is leased.

In one example in which behavior of DHCP server 34 may also be used to determine whether a subscriber device has physically moved between subscriber lines or whether another subscriber device has created a MAC collision, DHCP server 34 may probe the network in order to determine whether an IP address is in use before offering it to a new subscriber device, thereby avoiding MAC collisions. DHCP servers ensure that two devices never share the same IP address, thereby maintaining an IP address space. DHCP server 34 also attempts, whenever possible, to lease to a subscriber device, e.g., CPE 28A, the same IP address that DHCP server 34 previously leased to the subscriber device by comparing the MAC address of the subscriber device requesting an IP address to the mappings in IP binding and bridging table 60 that maps MAC addresses with their respective leased IP addresses. Before DHCP server 34 leases an IP address, however, processor 54 of DHCP server 34 executes instructions that probe the network in order to determine whether an IP address is in use before offering it to a new subscriber device. In some examples, DCHP server may probe the network using a ping, or equivalent, utility executed by processor 54. A ping utility generally involves processor 54 of DHCP server 34 transmitting a data unit, e.g., a packet, to a layer three address and then determining whether a reply data unit, e.g., a packet, is received from the layer three address in response to the ping command.

DHCP servers are central decision points with ample information to decide whether a device should be admitted to the network or not. DHCP servers are equipped with the physical identity, i.e., MAC address, of the subscriber device requesting access, the interface to which the subscriber device is connected, the type of subscriber device making the request, and the gateway interface that the subscriber device is associated with. DHCP servers are also deployed in clusters where they have access to a large segment or, in some cases, all of the network.

In the example scenario of subscriber device CPE 28A moving from subscriber line 26A to another subscriber line 26M, DCHP server 34 will not receive a reply to the DHCP server probe, e.g., ping command. DCHP server 34 will not receive a reply because, as discussed above and in accordance with the techniques of this disclosure, subscriber device CPE 28A must acquire an IP address before being allowed to use the network. Thus, based on a lack of response to its probe, DCHP server 34 determines that subscriber device CPE 28A has moved from one subscriber line to another subscriber line and offers subscriber device CPE 28A its former IP address, if possible.

If, before the DCHP server 34 leases an IP address, the DCHP server 34 probes the network and receives a reply, the DCHP server 34 may determine that another subscriber device is using the MAC address of a subscriber device that is currently using the network. For example, CPE 28A is currently using network system 10 via access node 12A and CPE 28M spoofs the MAC address of CPE 28A. CPE 28M will broadcast a DHCP "discovery" data unit in an attempt to lease an IP address from DHCP server 34. As mentioned above, DHCP server 34 attempts, whenever possible, to lease to a subscriber device the same IP address that DHCP server 34 previously leased to the subscriber device by comparing the MAC address of the subscriber device requesting an IP address to entries in IP binding and bridging table 60 that maps MAC addresses with their respective leased IP addresses.

DHCP server 34 extracts the MAC address of CPE 28M from the DHCP "discovery" data unit and determines, based on the comparison, that the CPE 28M was previously leased an IP address (because CPE 28M is spoofing the MAC address of CPE 28A). Before DHCP server 34 leases the IP address to CPE 28M, however, DHCP server 34 probes network system 10 in order to determine if the IP address is in use before offering it to CPE 28M. DHCP server 34 transmits a data unit, e.g., a packet, to the IP address. Because DHCP server 34 leased that IP address to CPE 28A and, as such, CPE 28A is authorized to use network system 10, CPE 28A sends a reply data unit, e.g., a packet, to DCHP server 34 in response to the probe. Upon receiving the reply from CPE 28A, DHCP server 34 determines that CPE 28M should not be issued an IP address. In this case, DHCP server 34 issues a different IP address and the access device uses this behavior to determine whether the two devices are the same device or different devices. In this manner, DHCP server 34 is further able to prevent MAC collisions in network system 10 using its probing capabilities.

Bridging tables in layer two switches are particularly susceptible to poisoning attempts because layer two switches always learn on any data unit, including DHCP data units.

Layer two switches generally do not contain the intelligence to distinguish between DHCP data units and other data units. As described above, techniques of this disclosure prevent traffic from a new subscriber device from being allowed on the network until the subscriber device acquires an IP address from the DHCP server. However, DHCP data units from a new subscriber device must be allowed to go through the network infrastructure in order for the subscriber device to acquire an IP address from the DHCP server. As such, layer two bridging tables remain at risk of being poisoned by via the DHCP data units sent from the new subscriber device.

In accordance with the disclosure, DHCP data units may also be isolated in the access network, e.g., access network 22, in order to protect any layer two bridging tables, e.g., the bridging table(s) in switch 30 in FIG. 1, that exist between the access node and the router. In one example, DHCP data units may be isolated in access network 22 by using DHCP layer three relay treatment at access node 12. That is, access node 12 may become a layer three relay agent.

Layer three relay refers to the process in which a layer two data unit is converted into a layer three data unit. For example, when subscriber device CPE 28A requests an IP address from DHCP server 34 via a DHCP "discovery" data unit, subscriber device CPE 28A includes in the source field in the header of the DHCP "discovery" data unit its MAC address. Because subscriber device CPE 28A does not know the address of DHCP server 34, subscriber device CPE 28A cannot place an actual destination address of DHCP server 34 in the destination field of the header. Instead, subscriber device CPE 28A must include a code, e.g., a bit pattern, in the destination field that specifies that the DHCP "discovery" data unit should be broadcast across the network, rather than being sent to a specific destination address. At some point in the network, a network device will receive the DHCP "discovery" data unit, determine that the network device it is connected to DHCP server 34 and, as such, can forward the DHCP "discovery" data unit to DHCP server 34. This network device is a layer three relay because it converts the DHCP "discovery" data unit from a broadcast data unit to a unicast data unit that is then forwarded to DHCP server 34.

In accordance with this disclosure, if the access node, e.g., access node 12A, is configured as a layer three relay agent, DHCP data units may be isolated in access network 22 in order to protect any layer two bridging tables, e.g., the bridging table in switch 30. Access node 12A, acting as a layer three relay, transmits a DHCP data unit from a new subscriber device, e.g., CPE 28A attempting to acquire an IP address towards the identity of DHCP server 34. In both the physical layer and the IP layer, DHCP server 34 is a legitimate and secure address. Furthermore, when configured as a layer three relay agent, access node 12A, as a source device, will no longer include the information of the new subscriber device, e.g., CPE 28A, that is attempting to acquire an IP address in the header of the DHCP data unit that access node 12A is forwarding to DHCP server 34. Rather, access node 12A decapsulates the DHCP data unit from new subscriber device CPE 28A, removes the MAC address of subscriber device CPE 28A from the source field of the header, adds its own MAC address and IP address to the source field of the DHCP data unit, adds the MAC address and IP address of DHCP server 34 to the destination field, encapsulates the data unit, and forwards the DHCP data unit to DHCP server 34.

To summarize, when configured to act as a layer three relay agent, access node 12A essentially acts as a DHCP proxy. By including its own MAC address and IP address in the source field, access node 12A signals to DHCP server 34 that access node 12A is requesting an IP address on behalf of a new subscriber device CPE 28A and any responses to that request should be sent directly to access node 12A, and access node 12A will relay the response to subscriber device CPE 28A.

Even though access node 12A removed the MAC address of subscriber device CPE 28A from the source field of the header, DHCP server 34 nevertheless is able to maintain the binding between subscriber device CPE 28A and any IP address that DHCP server 34 may assign to subscriber device CPE 28A. DHCP server 34 is able to maintain the binding because the body of the DHCP data unit includes the MAC address of subscriber device CPE 28A. The relay agent, e.g., access node 12A, does not change the body of the DHCP data unit. Thus, DHCP server 34 is able to determine the MAC address of subscriber device CPE 28A by extracting the MAC address of CPE 28A from the body of the DHCP data unit. In this manner, applying layer three relay treatment to access node 12A may prevent the layer two switch, e.g., switch 30, from learning the subscriber device's identity.

Applying layer three relay treatment to access node 12A is one example of how DHCP data units may be isolated in access network 22 in order to protect any layer two bridging tables. In another example, in accordance with the disclosure, DHCP data units may be isolated in access network 22 by utilizing a dedicated VLAN for DHCP interaction that transports traffic between access node 12A and router 32, coupled with layer two relay treatment on access node 12A. A layer two relay, in contrast to a layer three relay, does not convert a broadcast data unit to a unicast data unit. Rather, a layer two relay maintains the data unit as a broadcast data unit, but modifies the data unit to include a DHCP option as well as relay agent sub-options.

Utilizing a VLAN dedicated for DHCP interaction may isolate DHCP data units because VLANs are configurable to enable or disable learning, unlike layer two switches. By disabling learning on the VLAN, any layer two bridging tables between access node 12 and router 32 are protected. For example, in FIG. 1, VLAN B is a dedicated VLAN for transporting DHCP traffic between access node 12A, through switch 30, to router 32 and then finally to DHCP server 34 via line 52. VLAN B is dedicated in the sense that it only transports DHCP traffic, and all DHCP traffic between access nodes 12A must be transported on VLAN B.

In order to protect the bridging table of switch 30, learning is disabled on VLAN B. Although layer two switches such as switch 30 learn on any packets that are received, using a VLAN with learning disabled prevents the layer two switch from learning the MAC address of the subscriber device attempting to acquire an IP address. Instead, the layer two switch only learns the VLAN tag, i.e., the field that identifies the VLAN to which the data unit belongs, and maps the VLAN tag, e.g., VLAN B, to one of its interfaces/ports.

By way of example, VLAN B has been configured to include access node 12A, switch 30, and router 32. A new subscriber device CPE 28A sends a DHCP "discovery" data unit to access node 12A in an attempt to lease an IP address from DHCP server 34. Upon receiving the DHCP "discovery" data unit, control unit 42 of access node 12A, based on its configuration, determines that it must forward the DHCP "discovery" data unit out the interface that is mapped to VLAN B. Before forwarding the DHCP "discovery" data unit, access node 12A, acting as a layer two relay, inserts into the header of the data unit a VLAN tag identifying VLAN B. The DHCP "discovery" data unit is transported through access network 22 over VLAN B and arrives at switch 30. Switch 30 reads the VLAN tag, e.g., VLAN B, associated with the DHCP "discovery" data unit, determines from its bridging table that the DHCP "discovery" data unit should be switched to an interface/port that is mapped to VLAN B, and switches the DHCP "discovery" data unit out that particular interface/port. It should be noted that switch 30 does not learn the MAC address of the DHCP "discovery" data unit, but instead uses the VLAN tag associated with the DHCP "discovery" data unit, thereby protecting its bridging table. The DHCP "discovery" data unit is switched towards router 32. Upon receiving the DHCP "discovery" data unit, router 32 routes the DHCP "discovery" data unit to DCHP server 34.

In a similar manner, DHCP server 34 sends a DHCP "offer" data unit destined for CPE 28A over VLAN B through router 32, switch 30, and access node 12A. Once control unit 42 of access node 12A determines that CPE 28A has been authorized by DHCP server 34 to utilize network system 10, i.e., by determining that DHCP server 34 has provided CPE 28A an IP address, CPE 28A may access network system 10 via subscriber line 26A and VLAN A. In this manner, use of a dedicated VLAN, e.g., VLAN B, isolates all DHCP data units from the access network, thus protecting the bridging tables of any layer two switches, e.g., switch 30, from learning the physical identity, i.e., MAC address, of the source device, e.g., CPE 28A.

In accordance with this disclosure, an access node may also use a request-response protocol, e.g., a ping utility or address resolution protocol (ARP), exchange on the subscriber line in order to resolve a MAC collision. In one example, access node 12A detects a MAC collision with the DHCP "offer" data unit and, in response, generates a query toward the subscriber line where the subscriber device, e.g., CPE 28A was previously thought to be, e.g., subscriber line 26A. If subscriber device CPE 28A does not respond to the query on the interface connected to the previous home subscriber line, then the DHCP "offer" data unit is forwarded to subscriber device CPE 28A and the entry in IP binding and bridging table 48 on the previous home interface is removed. However, if subscriber device CPE 28A responds to the challenge on the interface connected to the previous home subscriber line, then a MAC collision is identified. In response to identifying a MAC collision, control unit 42 of access node 12A drops the DHCP request and processor 44 executes instructions that generate a message to be sent to the operator informing the operator of the MAC collision. In this manner, access node 12 may essentially quarantine a subscriber device, e.g., CPE 28A, despite the fact that DHCP server 34 had previously authorized subscriber device CPE 28A by providing subscriber device CPE 28A with an IP address, until access node 12A itself determines that no MAC collisions will take place. Thus, access node 12A is able to directly challenge any MAC collisions that it detects without having to rely upon DHCP server 34.

In addition to modifying the behavior of the access node, e.g., by preventing learning on DHCP traffic and/or by configuring the access node to be a layer three relay agent, and in addition to including configuring the network to include a dedicated VLAN for DHCP interaction between the access node and a router, techniques of this disclosure also include modifying DHCP server 34 to provide improved network security. In some examples, it may be desirable to modify DHCP server 34 in order to detect MAC collisions that occur between a subscriber line of one access node and a subscriber line of another access node when the two access nodes share a layer two domain, e.g., a VLAN. Referring to FIG. 1, assume, for example, that CPE 28A moved from access node 12A to access node 12N. In FIG. 1, access node 12A and access node 12N share a layer two domain, namely VLAN A. When two or more access nodes 12 share a layer two domain such as a VLAN, a data unit switched out switch 30 will be sent to all access nodes 12 configured within the VLAN.

In FIG. 1, switch 30 will switch the data units to both access node 12A and access node 12N. Unlike the example described above in which a subscriber device moved from one interface on access node 12A to another interface on access node 12A, a MAC collision cannot be detected by either access node 12A or 12N because each access node only maintains a bridging table with respect to its own interfaces. Referring again to FIG. 1, it should be noted that if access node 12A and access node 12N did not share a layer two domain, e.g., access node 12N formed part of VLAN C and not VLAN A (not shown), it would be unnecessary to use DHCP server 34 to detect MAC collisions because access node 12A and access node 12N would be able to detect any MAC collisions that may occur.

In accordance with this disclosure, DHCP server 34 may be modified in order to provide DHCP server 34 with the layer two domain information that uniquely identifies the switching domain to which a subscriber device is attempting to connect. In this manner, traditional DHCP layer three collision resolution, e.g., probing the network in order to determine if an IP address is in use before offering it to a new subscriber device, may, using techniques of this disclosure, be supplemented with layer two domain information so that a new subscriber device, having the same MAC address as another existing subscriber device on the same layer two domain, and attempting to access the network, is not given a lease by DHCP server 34. By providing DHCP server 34 with the layer two domain identity information, DHCP server 34 may be able to resolve layer two MAC collisions that access nodes 12 may otherwise be unable to resolve.

The additional layer two domain information may be communicated to DHCP server 34 via a DHCP option in a DHCP data unit. Each DHCP data unit contains an option field that allows a user to store parameters, values, or other information data within the option field. In accordance with this disclosure, an operator may include layer two domain identity information, e.g., a VLAN tag, a combination of VLAN tags, or some other unique identifier chosen by the operator that identifies the switching domain to which the subscriber device is trying to connect. In some examples, this additional layer two domain identity information 62 may be stored in memory 56 of DHCP server 34 separate from the IP address and MAC address information stored in IP binding and bridging table 60, as shown in FIG. 3. In other examples, the additional layer two domain identity information 62 may be stored in memory 56 in a single table along with the IP address and MAC address information stored in IP binding and bridging table 60.

In one example, the operator programs the domain identity information, e.g., the VLAN(s) associated with the subscriber device, or another unique identifier, to the access node, e.g., access node 12A. When access node 12A receives a DHCP data unit from a subscriber device, e.g. CPE 28A, access node 12A adds the domain identity information to the DHCP data units, and then relays the DHCP data units. The relayed DHCP data units reach switch 30, for example, and are switched to router 32. Router 32 determines, via its routing table, that the DHCP data units are destined for DHCP server 34 and routes the DHCP data units to DHCP server 34.

Upon receiving the DHCP data unit, processor 54 of DHCP server 34, executes instructions that access pool 58 from memory 56 and retrieve an IP address that is available to be leased to subscriber device CPE 28A. In some examples, as described above, DHCP server 34 may probe network system 10, e.g., using a ping utility, in order to determine whether the IP address to be leased to subscriber device CPE 28A already exists on network system 10. If DHCP server 34 does not receive a reply in response to the probe of network system 10, the IP address is available to be leased to the requesting subscriber device, namely CPE 28A. Processor 54 executes instructions that map the domain identity information, e.g., the VLAN(s) associated with the subscriber device, or another unique identifier, to the MAC address and the IP address of the subscriber device, and store the domain identity information, MAC address, and IP address to layer two domain identity information 62 in memory 56 or, in some examples, in IP binding and bridging table 60. In such a manner, DHCP server 34 may be provided with the layer two domain information that uniquely identifies the switching domain to which the subscriber device is attempting to connect.

It should be noted that the techniques of the disclosure described above might be combined in some implementations. For example, the DHCP data unit that comprises the domain identity information that uniquely identifies the switching domain to which the subscriber device is attempting to connect may be transmitted to DCHP server 34 over a dedicated VLAN, e.g., VLAN B, as described above, in order to protect the bridging tables of any layer two switches, e.g., switch 30.

In another example, a network system, e.g., network system 10, may include an access node, e.g., access node 12, modified in the manner described above such that it does not learn on any DHCP traffic until after a DHCP server, e.g., DHCP server 34, authorizes a subscriber device, and a DHCP server modified in the manner described above to accept and map domain identity information that uniquely identifies the switching domain to which the subscriber device is attempting to connect. Such a network system may include any of the techniques described above. For example, an access node of the network system may be configured to use a request-response protocol, e.g., a ping utility or ARP, exchange on the subscriber line to resolve a MAC collision, as described above. In another example, the network system may be configured such that an access node is configured as a layer three relay agent. In another example, the network system may be configured such that an access node is configured as a layer two relay agent and a dedicated VLAN is utilized in the manner described above to isolated DHCP traffic through the access network. These combinations of techniques are meant to illustrate some of the example configurations that may be implemented in a network system. Numerous other combinations of techniques are possible and, although not explicitly described, are nevertheless considered to form part of this disclosure.

Figure 4:
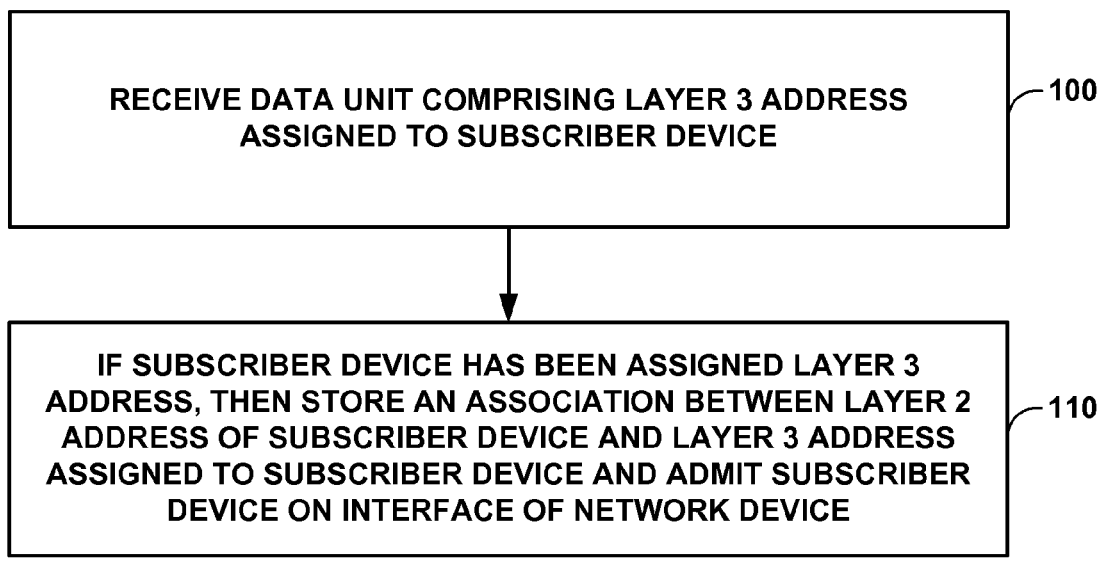
FIG. 4 is a flow diagram illustrating an example method of preventing layer two collisions in a network by a network device.

FIG. 4 is a flow diagram illustrating an example method of preventing layer two collisions in a network by a network device. In the method illustrated in FIG. 4, network device 12 receives a data unit comprising a layer three address assigned to subscriber device 28 (100). In some examples, network device 12 is an access node. In other examples, access node 12 is part of network system 10. If subscriber device 28 has been assigned the layer three address, then network device 12 stores, in memory device 46, an association between a layer two address of subscriber device 28 and the layer three address assigned to subscriber device 28 (110). The association, or mapping, between the layer two address, e.g., MAC address, of subscriber device 28 and the layer three address, e.g., IP address, assigned to subscriber device 28 may be stored in table 48. If subscriber device 28 is assigned a layer three address, e.g., an IP address, network device 12 then admits subscriber device 28 on interface 40 of network device 12.

In addition, in one example, the method shown in FIG. 4 may also include a step of storing, for each of a plurality of subscriber lines 26, an association between a plurality of layer two addresses and a plurality of layer three addresses in table 48, and comparing a layer two address, e.g., MAC address, and a layer three address, e.g., IP address, of a second subscriber device 28M attempting to connect to network device 12 with the plurality of layer two addresses and the plurality of layer three addresses in table 48. In other examples, the method of FIG. 4 may also include denying second subscriber device 28M admittance to access network 22 based on the comparison if first subscriber device 28A and second subscriber device 28M share the same layer two address but have different layer three addresses, or admitting second subscriber device 28M on second interface 40M based on the comparison if first subscriber device 28A and second subscriber device 28M share the same layer two address and share the same layer three address. In some examples, admittance to access network 22 may generally refer to allowing second subscriber device 28M communication with access network 22. In other examples, admittance may refer to a process of establishing an entry in a MAC forwarding table and establishing a rule allowing packets with the specified source MAC address and layer 3 source IP address to be forwarded to the access network. In some examples, admitting second subscriber device 28M to access network 22 may include removing the layer two address and the layer three address of first subscriber device 28A from table 48, and adding the layer two address and the layer three address of second subscriber device 28M and second interface 40M of network device 12 to table 48.

In other examples, the method may include probing network 10 to determine whether a layer three address is in use before admitting first subscriber device 28A on first interface 40A of network device 12. In some examples, probing network 10 may include transmitting a data unit using a ping utility to the layer three address, and determining whether a reply data unit is received from the layer three address in response to the ping utility. In one example, 'probing' refers to sending a data unit using a ping utility and taking action based on whether a reply is received within a given time period.

In some examples, the method shown in FIG. 4 may also include informing an operator, e.g., using Simply network management protocol (SNMP) trap or polled status, if first subscriber device 28A and second subscriber device 28M share the same layer two address but have different layer three addresses, and dropping, e.g., discarding, a Dynamic Host Configuration Protocol (DHCP) offer to second subscriber device 28M.

In another example, the method depicted in FIG. 4 may also include protecting a table in second network device 30 by configuring first network device 12A as a layer three relay agent.

In some examples, the method shown in FIG. 4 may also include protecting a table in second network device 30 by configuring first network device 12 to act as a layer two relay agent, and providing a dedicated VLAN for transmitting DHCP data unit traffic, wherein the VLAN comprises first network device 12, second network device 30, and third network device 32, and wherein third network device 32 is in communication with DHCP server 34. In one example, first network device 12 includes an access node, second network device 30 includes a layer two switch, and third network device 32 includes a layer three router.

Figure 5:
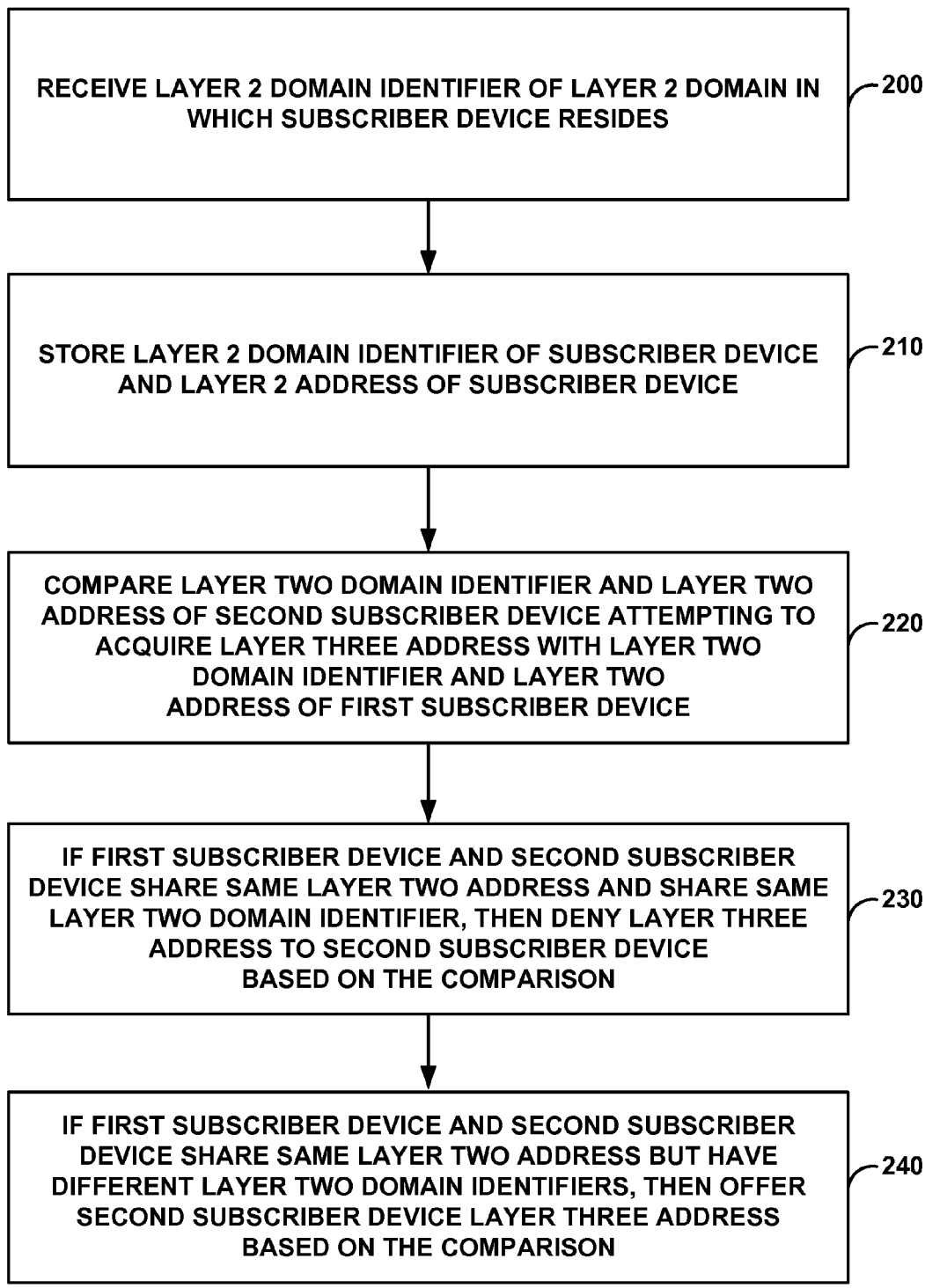
FIG. 5 is a flow diagram illustrating another example method of preventing layer two collisions in a network by a network device.

FIG. 5 is a flow diagram illustrating another example method of preventing layer two collisions in a network by a network device. In the method illustrated in FIG. 5, DCHP server 34 receives the layer two domain identifier of the layer two domain in which a first subscriber device CPE 28A resides (200). In some examples, the layer two domain identifier is received as a DHCP option in a DHCP message relayed from subscriber device CPE 28A. In one example, the layer two domain identifier includes at least one VLAN identifier associated with subscriber device CPE 28A. In response to receiving the layer two domain identifier, DHCP server 34 stores the layer two domain identifier of first subscriber device CPE 28A and a layer two address of subscriber device CPE 28A (210). DHCP server 34 compares the layer two domain identifier, e.g., VLAN ID, and a layer two address, e.g., MAC address, of second subscriber device CPE 28M attempting to acquire a layer three address, e.g., an IP address, with the layer two domain identifier and layer two address, e.g., MAC address, of first subscriber device CPE 28A (220). The method includes network device 34 denying a layer three address to second subscriber device CPE 28M based on the comparison if first subscriber device CPE 28A and second subscriber device CPE 28M share the same layer two address and share the same layer two domain identifier (230), and offering second subscriber device CPE 28M a layer three address based on the comparison if first subscriber device CPE 28A and second subscriber device CPE 28M share the same layer two address but have different layer two domain identifiers (240).

In some examples, the method depicted in FIG. 5 may also include network device 34 storing, for each of a plurality of subscriber lines, an association between a plurality of layer two domain identifiers and a plurality of layer two addresses in table 60. Network device 34 compares a layer two domain identifier and a layer two address of a subscriber device attempting to acquire a layer three address with the plurality of layer two domain identifiers and the plurality of layer two addresses in table 60, for example.

In another example, the method of FIG. 5 may include network device 34 probing network 10 to determine whether a layer three address is in use before offering the layer three address to first subscriber device CPE 28A. In one example, probing network 10 may include transmitting a data unit using a ping utility to the layer three address, and determining whether a reply data unit is received from the layer three address in response to the ping utility.

In another example, in the method of FIG. 5, the method may further include protecting a table in second network device switch 30 by configuring third network device access node 12 to act as a layer two relay agent, and providing a dedicated VLAN for transmitting DHCP data unit traffic, wherein the VLAN comprises second network device switch 30, third network device access node 12, and fourth network device router 32, and wherein the fourth network device router 32 is in electrical communication with the first network device DCHP server 34.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the disclosure have been described. These and other examples are within the scope of the following claims.

The invention claimed is:

1. A method comprising:
   receiving a data unit at a network device, the data unit including a layer two address for a subscriber device; and determining when the subscriber device has been assigned a layer three address by a layer 3 address server;
   when the subscriber device has been assigned the layer three address by the layer 3 address server, then:
   storing, in a memory device, an association between the layer two address of the subscriber device and the layer three address assigned to the subscriber device; and
   admitting the subscriber device on an interface of the network device based on the assignment of the layer three address; and wherein the network device does not store an association for the subscriber device when the subscriber device has not been assigned the layer three address by the layer 3 address server such that the network device does not learn on the data unit until a layer three address has been assigned to the subscriber device.

2. The method of claim 1, wherein the subscriber device is a first subscriber device, wherein the interface is a first interface, and wherein the association between layer two address of the first subscriber device and the layer three address assigned to the first subscriber device is stored in a table, the method further comprising:
   storing, for each of a plurality of subscriber lines, an association between a plurality of layer two addresses and a plurality of layer three addresses in the table;
   comparing a layer two address and a layer three address of a second subscriber device attempting to connect to the network device with the plurality of layer two addresses and the plurality of layer three addresses in the table;
if the first subscriber device and the second subscriber device share the same layer two address but have different layer three addresses, then denying admittance to the second subscriber device based on the comparison; and
if the first subscriber device and the second subscriber device share the same layer two address and share the same layer three address, then admitting the second subscriber device on a second interface based on the comparison.

3. The method of claim 2, wherein admitting the second subscriber device further comprises:
removing the layer two address and the layer three address of the first subscriber device from the table; and
adding the layer two address and the layer three address of the second subscriber device and the second interface to the table.

4. The method of claim 3, further comprising:
informing an operator if the first subscriber device and the second subscriber device share the same layer two address but have different layer three addresses; and
dropping a Dynamic Host Configuration Protocol (DHCP) offer to the second subscriber device.

5. The method of claim 1, further comprising:
probing the network to determine whether a layer three address is in use before admitting the subscriber device on the interface of the network device.

6. The method of claim 5, wherein probing the network comprises:
transmitting a data unit using a ping utility to the layer three address; and
determining whether a reply data unit is received from the layer three address in response to the ping utility.

7. The method of claim 1, wherein the network device is a first network device, the method further comprising:
protecting a table in a second network device by configuring the first network device as a layer three relay agent.

8. The method of claim 1, wherein the network device is a first network device, the method further comprising:
protecting a table in a second network device by configuring the first network device to act as a layer two relay agent; and
providing a dedicated Virtual Local Area Network (VLAN) for transmitting Dynamic Host Configuration Protocol (DHCP) data unit traffic, wherein the VLAN comprises the first network device, the second network device, and a third network device, and wherein the third network device is in communication with a DHCP server.

9. The method of claim 8, wherein the first network device is an access node, the second network device includes a layer two switch, and the third network device includes a layer three router.

10. The method of claim 9, wherein the access node is part of an access network.

11. A network device comprising a control unit configured to:
receive a data unit comprising a layer two address for a subscriber device;
determine when the subscriber device has been assigned a layer three address by a layer 3 address server; when the subscriber device has been assigned the layer three address by the layer 3 address server, then: store, in a memory device, an association between the layer two address of the subscriber device and the layer three address assigned to the subscriber device; and admit the subscriber device on an interface of the network device based on the assignment of the layer three address; and
wherein the network device does not store an association for the subscriber device when the subscriber device has not been assigned the layer three address by the layer 3 address server such that the network device does not associate the layer two address in the data unit with the interface of the network device coupled to the subscriber device until a layer three address has been assigned to the subscriber device.

12. The network device of claim 11, wherein the subscriber device is a first subscriber device, wherein the interface is a first interface, and wherein the association between the layer two address of the first subscriber device and the layer three address assigned to the first subscriber device is stored in a table, wherein the control unit is further configured to:
store, for each of a plurality of subscriber lines, an association between a plurality of layer two addresses and a plurality of layer three addresses in the table; and
compare a layer two address and a layer three address of a second subscriber device attempting to connect to the network device with the plurality of layer two addresses and the plurality of layer three addresses in the table;
if the first subscriber device and the second subscriber device share the same layer two address but have different layer three addresses, then deny admittance to a second subscriber device based on the comparison; and
if the first subscriber device and the second subscriber device share the same layer two address and share the same layer three address, then admit the second subscriber device on a second interface based on the comparison.

13. The network device of claim 12, wherein the control unit is further configured to:
remove the layer two address and the layer three address of the first subscriber device from the table; and
add the layer two address and the layer three address of the second subscriber device and the second interface to the table.

14. The network device of claim 13, wherein the control unit is further configured to:
inform an operator if the first subscriber device and the second subscriber device share the same layer two address but have different layer three addresses; and
drop a Dynamic Host Configuration Protocol (DHCP) offer to the second subscriber device.

15. The network device of claim 11, wherein the control unit is further configured to:
probe the network to determine whether a layer three address is in use before admitting the subscriber device on the interface of the network device.

16. The network device of claim 15, wherein the control unit configured to probe the network is configured to:
transmit a data unit using a ping utility to the layer three address; and
determine whether a reply data unit is received from the layer three address in response to the ping utility.

17. The network device of claim 11, wherein the network device is a first network device, and wherein the control unit is further configured to:
protect a table in a second network device by configuring the first network device as a layer three relay agent.

18. The network device of claim 11, wherein the network device is a first network device, and wherein the control unit is further configured to:
protect a table in a second network device by configuring the first network device as a layer two relay agent; and provide a dedicated Virtual Local Area Network (VLAN) for transmitting Dynamic Host Configuration Protocol (DHCP) data unit traffic, wherein the VLAN comprises the first network device, the second network device, and a third network device, and wherein the third network device is in electrical communication with a DHCP server.

19. A non-transitory computer-readable storage medium comprising instructions encoded on the computer-readable medium that, upon execution, cause a processor within a network device to: receive a data unit, the data unit including a layer two address for a subscriber device; and determine when the subscriber device has been assigned a layer three address by a layer 3 address server;
when the subscriber device has been assigned the layer three address by the layer 3 address server, then: store, in a memory device, an association between the layer two address of the subscriber device and the layer three address assigned to the subscriber device; and admit the subscriber device on an interface of the network device based on the assignment of the layer three address; and
wherein the network device does not store an association for the subscriber device when the subscriber device has not been assigned the layer three address by the layer 3 address server such that the network device does not learn the layer two address in the data unit until a layer three address has been assigned to the subscriber device.

20. The non-transitory computer-readable storage of claim 19, wherein the subscriber device is a first subscriber device, wherein the interface is a first interface, and wherein the association between the layer two address of the first subscriber device and the layer three address assigned to the first subscriber device are mapped in a table, the medium further comprising instructions to cause the processor to:
store, for each of a plurality of subscriber lines, an association between a plurality of layer two addresses and a plurality of layer three addresses in the table; and
compare a layer two address and a layer three address of a second subscriber device attempting to connect to the network device with the plurality of layer two addresses and the plurality of layer three addresses in the table;
if the first subscriber device and the second subscriber device share the same layer two address but have different layer three addresses, then deny admittance to the second subscriber device based on the comparison; and
if the first subscriber device and the second subscriber device share the same layer two address and share the same layer three address, then admit the second subscriber device on a second interface based on the comparison.

21. The non-transitory computer-readable storage of claim 20, wherein the instructions to cause the processor to admit the second subscriber device further comprises instructions to cause the processor to:
remove the layer two address and the layer three address of the first subscriber device from the table; and
add the layer two address and the layer three address of the second subscriber device and the second interface to the table.

22. The non-transitory computer-readable storage of claim 21, further comprising instructions to cause the processor to:
inform an operator if the first subscriber device and the second subscriber device share the same layer two address but have different layer three addresses; and
drop a Dynamic Host Configuration Protocol (DHCP) offer to the second subscriber device.

23. The non-transitory computer-readable storage of claim 19, further comprising instructions to cause the processor to:
probe the network to determine whether a layer three address is in use before admitting the subscriber device on the interface of the network device.

24. The non-transitory computer-readable storage of claim 23, wherein the instructions to cause the processor to probe the network comprise instructions to cause the processor to:
transmit a data unit using a ping utility to the layer three address; and
determine whether a reply data unit is received from the layer three address in response to the ping utility.

25. The non-transitory computer-readable storage of claim 19, wherein the network device is a first network device, the medium further comprising instructions to cause the processor to:
protect a table in a second network device by configuring the first network device as a layer three relay agent.

26. The non-transitory computer-readable storage of claim 19, wherein the network device is a first network device, the medium further comprising instructions to cause the processor to:
protect a table in a second network device by configuring the first network device to act as a layer two relay agent; and
provide a dedicated Virtual Local Area Network (VLAN) for transmitting Dynamic Host Configuration Protocol (DHCP) data unit traffic, wherein the VLAN comprises the first network device, the second network device, and a third network device, and wherein the third network device is in electrical communication with a DHCP server.

27. The non-transitory computer-readable storage of claim 26, wherein the first network device is an access node, the second network device includes a layer two switch, and the third network device includes a layer three router.

28. The non-transitory computer-readable storage of claim 27, wherein the access node is part of an access network.

29. A network device comprising:
means for receiving a data unit at a network device, the data unit including a layer two address for a subscriber device; and means for determining when the subscriber device has been assigned a layer three address by a layer 3 address server;
when the subscriber device has been assigned the layer three address by the layer 3 address server, then: means for storing, in a memory device, an association between the layer two address of the subscriber device and the layer three address assigned to the subscriber device; and means for admitting the subscriber device on an interface of the network device based on the assignment of the layer three address; and
wherein the network device does not store an association for the subscriber device when the subscriber device has not been assigned the layer three address by the layer 3 address server such that the network device does not learn on the data unit until a layer three address has been assigned to the subscriber device.

30. The network device of claim 29, wherein the subscriber device is a first subscriber device, wherein the interface is a first interface, and wherein the association between layer two address of the first subscriber device and the layer three address assigned to the first subscriber device is stored in a table, the network device further comprising:
means for storing, for each of a plurality of subscriber lines, an association between a plurality of layer two addresses and a plurality of layer three addresses in the table;

means for comparing a layer two address and a layer three address of a second subscriber device attempting to connect to the network device with the plurality of layer two addresses and the plurality of layer three addresses in the table;

if the first subscriber device and the second subscriber device share the same layer two address but have different layer three addresses, then means for denying admittance to the second subscriber device based on the comparison; and if the first subscriber device and the second subscriber device share the same layer two address and share the same layer three address, then means for admitting the second subscriber device on a second interface based on the comparison.

31. The network device of claim 30, wherein the means for admitting the second subscriber device further comprises:

means for removing the layer two address and the layer three address of the first subscriber device from the table; and means for adding the layer two address and the layer three address of the second subscriber device and the second interface to the table.

32. The network device of claim 29, wherein the network device is a first network device, the network device further comprising:

means for protecting a table in a second network device by configuring the first network device as a layer three relay agent.

33. The network device of claim 29, wherein the network device is a first network device, the network device further comprising:

means for protecting a table in a second network device by configuring the first network device to act as a layer two relay agent; and means for providing a dedicated Virtual Local Area Network (VLAN) for transmitting Dynamic Host Configuration Protocol (DHCP) data unit traffic, wherein the VLAN comprises the first network device, the second network device, and a third network device, and wherein the third network device is in communication with a DHCP server.

34. The network device of claim 33, wherein the first network device is an access node, the second network device includes a layer two switch, and the third network device includes a layer three router.

35. The network device of claim 34, wherein the access node is part of an access network.

* * * * *